(12) United States Patent
Rajagopalan (10) Patent No.: US 11,870,819 B1
(45) Date of Patent: Jan. 9, 2024

(54) SHARING ENTITY CHANGES FROM A CLOUD ACCESS SECURITY BROKER (CASB) PROXY TO A CASB APPLICATION PROGRAMMING INTERFACE (API) ENDPOINT

(71) Applicant: Netskope, Inc., Santa Clara, CA (US)

(72) Inventor: Chandrasekaran Rajagopalan, San Jose, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/313,100

(22) Filed: May 5, 2023

(51) Int. Cl.
*H04L 9/40* (2022.01)
*G06F 9/54* (2006.01)

(52) U.S. Cl.
CPC .............. *H04L 63/20* (2013.01); *G06F 9/542* (2013.01); *H04L 63/0281* (2013.01)

(58) Field of Classification Search
CPC ...... H04L 63/20; H04L 63/0281; G06F 9/542
See application file for complete search history.

(56) References Cited

U.S. PATENT DOCUMENTS

| | | | |
|---|---|---|---|
| 11,178,188 B1* | 11/2021 | Wu | G06F 21/6218 |
| 11,184,403 B1* | 11/2021 | Wu | H04L 67/10 |
| 11,190,550 B1* | 11/2021 | Wu | H04L 63/20 |
| 11,271,972 B1* | 3/2022 | Ravi | H04L 63/0236 |
| 11,271,973 B1* | 3/2022 | Ravi | H04L 67/561 |
| 11,303,647 B1* | 4/2022 | Wu | H04L 63/105 |
| 11,336,698 B1* | 5/2022 | Wu | G06F 21/54 |

OTHER PUBLICATIONS

Cloud Access Security Broker (CASB): A pattern for secure access to cloud services. the 4th Asian Conference on Pattern Languages of Programs, Asian PLoP'15, Mar. 5-7, Tokyo, Japan. 2015, pp. 1-8) by Fernandez et al. (Year: 2015).*
(Enhancing Features of Cloud Computing Using Cloud Access Security Brokers to Avoid Data Breaches. EJERS, European Journal of Engineering Research and Science vol. 4, No. 10, Oct. 2019, pp. 185-189) by Kaur et al. (Year: 2019).*
(GOOGLE translated KR20190135128A, published Dec. 6, 2019 by 정문권, 8 pages) (Year: 2019).*

* cited by examiner

*Primary Examiner* — Oleg Korsak (57) ABSTRACT

A cloud service security enforcement system may include a Cloud Access Security Broker (CASB) proxy and a CASB Application Programming Interface (API) endpoint. Upon receipt of a request for a change operation by a user device, the CASB proxy may execute security enforcement and, upon determining the change operation is allowed, transmit a notification of the change operation to the CASB API endpoint and the cloud service. The CASB API endpoint may pre-process for security enforcement of the change operation based on the notification. When the CASB API endpoint receives the notification from the cloud service of the change operation, the CASB API endpoint may finalize the security enforcement using the pre-processing previously done to expedite the security enforcement and reduce the experienced change processing latency.

20 Claims, 6 Drawing Sheets

SHARING ENTITY CHANGES FROM A CLOUD ACCESS SECURITY BROKER (CASB) PROXY TO A CASB APPLICATION PROGRAMMING INTERFACE (API) ENDPOINT

BACKGROUND

Cloud services are ubiquitous today. Individuals and enterprises use cloud services, including software as a service (SaaS), for storing content (e.g., files), updating the content, sharing the content, and using various software services with the content. Cloud Access Security Broker (CASB) systems may be used to ensure security for cloud users as third-party providers. In other words, the CASB provider may not be the cloud service provider. CASB systems may be customized to perform security checks to stop unsecure behavior (e.g., sharing classified documents with unauthorized entities, allowing unauthorized entities to change documents, and the like). One form of CASB system is a CASB proxy that is virtually located between the user devices and the cloud service so that the CASB proxy intercepts change operations (e.g., sharing, content update, and the like) and performs security processing on the change operation to determine whether it is allowed. If the change operation is allowed, the CASB proxy forwards the change operation to the cloud service for execution. If the change operation is not allowed, the CASB proxy blocks the change operation from reaching the cloud service for execution.

Another form of CASB system is a CASB Application Programming Interface (API) endpoint. The cloud service communicates with the CASB API endpoint and provides change notifications to the CASB API endpoint after executing the change requested by the change operation. The CASB API endpoint performs security processing on the change operation upon receipt of the notification. If the change operation is not allowed, the CASB API endpoint sends a response that indicates the change operation is not allowed or some modification to the change operation is required to maintain security compliance. In response, the cloud service rolls back (i.e., undoes) the change or modifies the change to maintain security compliance as indicated by the CASB API endpoint. Because a change is made prior to security enforcement with a CASB API endpoint, minimizing the latency between when the change is made and when it is rolled back or modified if it is not allowed is highly desired.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect may include a computer-implemented method for performing CASB API endpoint security enforcement including receiving, at the CASB API endpoint, a notification of a change operation from a CASB proxy. The change operation may include instructions from a user device for changing data stored in a cloud service. The method may further include initiating, by the CASB API endpoint, pre-processing for security analysis of the change operation based on the notification. The CASB API endpoint may receive a second notification of the change operation from the cloud service and finalize the security analysis of the change operation based on the second notification using the pre-processing already performed. Other embodiments of this aspect include corresponding computer systems, apparatus, and computer programs recorded on one or more computer storage devices, each configured to perform the actions of the methods.

Implementations may include one or more of the following features. In some embodiments, the notification may include account information for an entity (e.g., user account) requesting the change operation. In some embodiments, the notification may include a change type of the change operation. In some embodiments, the pre-processing may include obtaining current metadata associated with the change operation from a local datastore. In some embodiments, the pre-processing may include pre-evaluating for policies based on the notification and caching the policies. In some embodiments, the pre-processing may include downloading data stored in the cloud service associated with the notification; and caching the data. In some embodiments, the CASB API endpoint may store an entry of the notification in a queue and an entry of the second notification in the queue. The CASB API endpoint may process the queue in order. In some embodiments, the CASB API endpoint may associate the notification and the second notification based on metadata in a header of each notification (e.g., a tag). In some embodiments, the CASB proxy and the CASB API endpoint may be co-located in a datacenter. In some embodiments, the CASB proxy and the CASB API endpoint may be communicably connected as data plane point of presence (DP-POP) and management plane data center (MP-DC). Implementations of the described techniques may include hardware, a method or process, or computer software on a computer-accessible medium.

Another general aspect may include another computer-implemented method for performing CASB proxy security enforcement including receiving, at CASB proxy, a change operation from a user device. The change operation may include instructions for changing data stored in a cloud service. The CASB proxy may perform security analysis of the change operation and, based on the security analysis, determine the change operation is allowed. In response to allowing the change operation, the CASB proxy may transmit the change operation to the cloud service and a notification of the change operation to the CASB API endpoint. Other embodiments of this aspect include corresponding computer systems, apparatus, and computer programs recorded on one or more computer storage devices, each configured to perform the actions of the methods.

In some embodiments, the CASB proxy may receive confirmation that the change operation was performed from the cloud service. Implementations of the described techniques may include hardware, a method or process, or computer software on a computer-accessible medium.

Another general aspect may include a system including a CASB proxy communicably coupled between a user device and a cloud service. The system may further include a CASB API endpoint communicably coupled to the cloud service and the CASB proxy. The CASB proxy may include one or more proxy processors and proxy memory storing instructions for performing proxy security enforcement. The proxy security enforcement may include receiving the change operation from the user device. The change operation may include instructions for changing data stored in the cloud service. The proxy security enforcement may include performing proxy security analysis of the change operation and, based on the proxy security analysis, determining the change operation is allowed. In response to determining the change operation is allowed, the CASB proxy may transmit the change operation to the cloud service and a notification of the change operation to CASB API endpoint. The CASB API endpoint may include one or more processors and memory storing instructions for performing security enforcement. The security enforcement may include receiving the notification of the change operation from the CASB proxy and initiating pre-processing for security analysis of the change operation based on the notification. The security enforcement may further include receiving a second notification of the change operation from the cloud service and finalizing the security analysis of the change operation using the pre-processing and based on the second notification. Other embodiments of this aspect include corresponding computer systems, apparatus, and computer programs recorded on one or more computer storage devices, each configured to perform the actions of the methods.

Implementations may include one or more of the following features. In some embodiments, the notification may include account information for the requesting entity or user, the change operation, a change type of the change operation, or a combination thereof. In some embodiments, the pre-processing may include obtaining current metadata associated with the change operation from a local datastore. In some embodiments, the pre-processing may include pre-evaluating for policies based on the notification and caching the policies. In some embodiments, the pre-processing may include downloading data associated with the change operation stored in the cloud service and caching the data. In some embodiments, the security enforcement may include storing an entry of the notification in a queue and storing a second entry of the second notification in the queue. The security enforcement may include processing the queue in order. In some embodiments, the security enforcement may include associating the notification and the second notification based on metadata in the notifications (e.g., a tag). In some embodiments, the proxy security enforcement may include receiving confirmation that the change operation was performed from the cloud service. Implementations of the described techniques may include hardware, a method or process, or computer software on a computer-accessible medium.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

As described above, the Cloud Access Security Broker (CASB) proxy provides security enforcement prior to implementation of the requested change by the cloud service. The CASB Application Programming Interface (API) endpoint provides security enforcement after implementation of the requested change by the cloud service. While both CASB proxy and CASB API endpoint provide security enforcement and have some overlapping functionality, both have unique capabilities. Because of the unique capabilities, some customers utilize both for the same accounts and cloud services.

The change processing latency of the CASB API endpoint includes the time taken for the cloud service to notify the CASB API endpoint of the change operation plus the time taken for the CASB API endpoint to process the change notification plus the time taken for the CASB API to update the cloud service if there are changes required to meet the security requirements. The change processing latency is an important metric because it is a window of time when violations to the security requirements are open. Minimizing the change processing latency is highly desired to minimize the potential for security breaches.

As discussed in more detail below, the change processing latency can be substantially reduced in systems including a CASB proxy and a CASB API endpoint. The CASB proxy receives the change the entity intends to make even before the cloud service receives it. Accordingly, the CASB proxy can notify the CASB API endpoint of the change, and the CASB API endpoint can perform pre-processing to expedite processing the security enforcement once the cloud service notifies the CASB API endpoint of the change. As a result, the change processing latency is substantially reduced.

Technological improvements include substantial improvements in change processing latency. In testing, the change processing latency is reduced by up to 40 percent (40%) when the CASB proxy sends a notification of the change operation to the CASB API endpoint over the CASB proxy not sending the notification to the CASB API endpoint. The opportunity for security breaches is reduced by reduction of the change processing latency.

Figure 1:
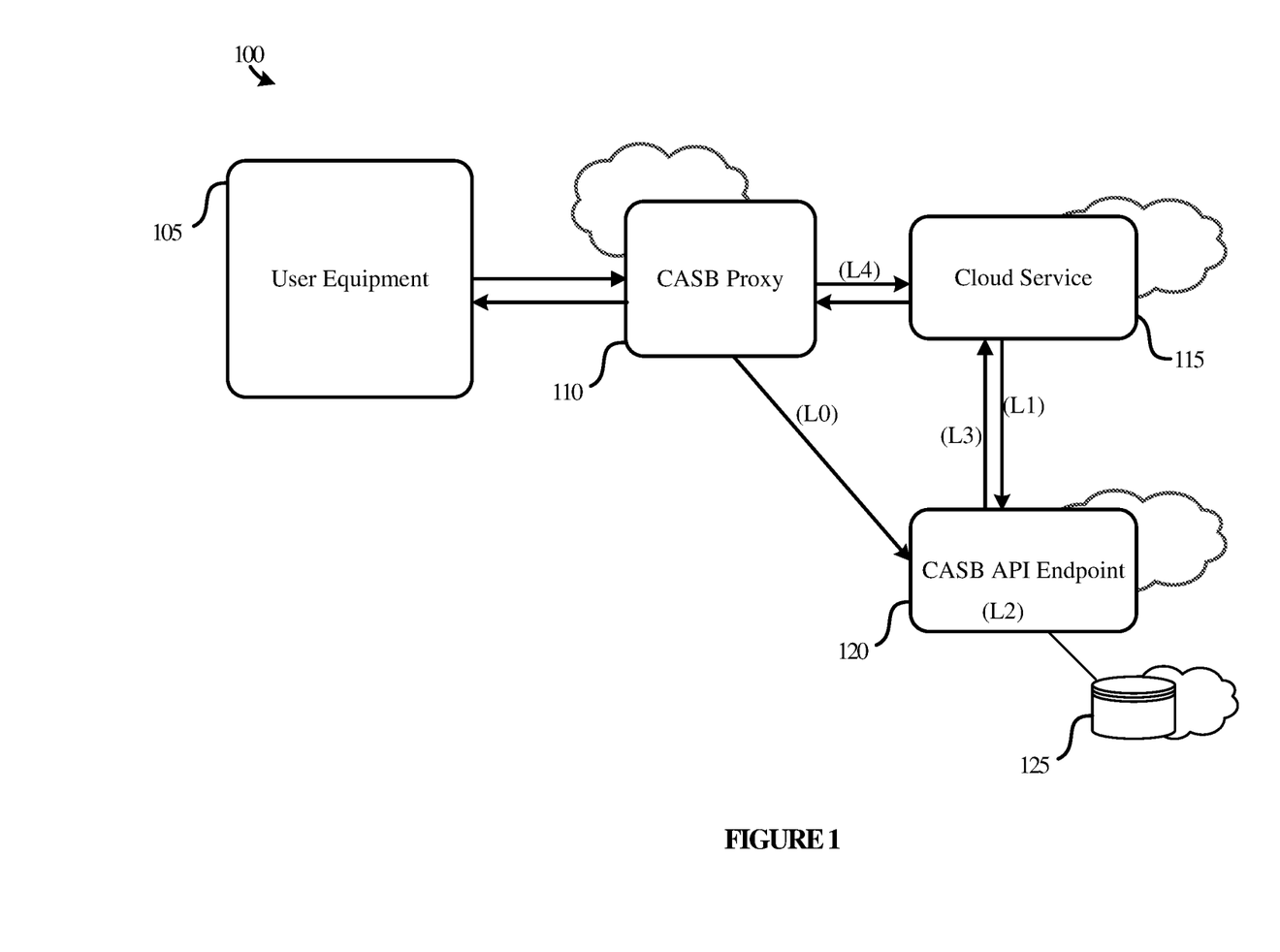
FIG. 1 illustrates an environment for security enforcement of a cloud service, according to some embodiments.

Turning now to the figures, FIG. 1 illustrates an environment 100 for security enforcement of a cloud service 115. Environment 100 includes user equipment 105, Cloud Access Security Broker (CASB) proxy 110, cloud service 115, CASB Application Programming Interface (API) endpoint 120, and CASB API datastore 125.

User equipment 105 may be any computing device having a processor and communication hardware and software capable of connecting to a cloud service 115 as well as the user interface hardware and software to allow the user to interact with the cloud service 115. User equipment 105 may be, for example, a laptop, a smartphone, a desktop computer, a smartwatch, a tablet, or the like. For example, user equipment 105 may be computing device 600 as described with respect to FIG. 6. While only one user equipment 105 is depicted, environment 100 may include any number of user equipment 105 that may use cloud service 115. In some embodiments, many different users, each having a user account, may access cloud service 115 as a member of an enterprise (e.g., a company having many employees each having a user account). Each user may use a different user equipment 105 or many users may use the same user equipment 105 but each log in to cloud service 115 with their own user account.

Cloud service 115 may be any service available as a cloud solution such as a content storing system (e.g., DROP-BOX™, GOOGLE DRIVE™), a content modification system (e.g., MICROSOFT 360™, GOOGLE DOCS™), or any content service provided as a cloud solution.

CASB proxy 110 may be a security enforcement proxy that provides security enforcement as a third-party component to users of cloud service 115. For example, CASB proxy 110 may have clients that require all users of the client (e.g., all employees of a company) that use cloud service 115 to utilize security enforcement provided by CASB proxy 110. Accordingly, CASB proxy 110 intercepts all change operations (e.g., sharing, content updates, content additions, content deletions, and the like) and enforces security on the change operations as specified by the client. For example, certain content may be confidential and accordingly a rule may require it not be shared to unauthorized entities (e.g., publicly, to users without specific security clearance, or the like). After reviewing the change operation and applying security policies to the change operation, CASB proxy 110 may determine the change operation is not allowed. As a result, CASB proxy 110 may deny the change and block the change operation from cloud service 115. Alternatively, after reviewing the change operation and applying security policies to the change operation, CASB proxy 110 may determine the change operation is allowed. As a result, CASB proxy 110 will transmit the change operation to cloud service 115 for execution. To expedite CASB API endpoint 120 processing, CASB proxy 110 can transmit a notification of the change operation to CASB API endpoint 120. The notification may include information including metadata in the header that identifies the change operation (e.g., a tag), the entity requesting the change (e.g., a user account), the change type of the change operation (e.g., sharing, content update, or the like), or other information that may allow CASB API endpoint 120 to perform pre-processing that expedites the security enforcement of the change operation once CASB API endpoint 120 receives notification from cloud service 115 of the change operation. CASB proxy 110 may be served from a computing system in a data center, for example. The computing system may be, for example, computing device 600 as described with respect to FIG. 6. While a single CASB proxy 110 is shown for ease of description, many CASB proxy 110 may be implemented to perform security enforcement for many clients each having many user equipment 105. Further details of CASB proxy 110 are provided in FIG. 2 and the corresponding description.

CASB API endpoint 120 may be a security enforcement endpoint that provides security enforcement as a third-party component to users of cloud service 115. The client that implements CASB proxy 110 may also implement CASB API endpoint 120. After cloud service 115 receives the change operation from CASB proxy 110, cloud service 115 may execute the change operation and send a notification of the change operation to CASB API endpoint 120. However, prior to that, CASB proxy 110 sends a notification of the change operation to CASB API endpoint 120 when CASB proxy 110 sends the change operation to cloud service 115 as noted above. CASB API endpoint 120 may perform pre-processing based on the notification from CASB proxy 110. The notification of the change operation from CASB proxy 110 may include account information of the user or entity requesting the change operation as well as other metadata associated with the account, user, or entity. The notification may also include the change type (e.g., sharing, content update, or the like) of the change operation and associated metadata (e.g., the file name of the content). The notification may further include a header with information identifying the change notification such as, for example, a tag id or other identifier.

The pre-processing may include fetching the current metadata related to the change operation from the CASB API datastore 125. For example, if CASB API endpoint 120 had previously performed security enforcement on the impacted content (e.g., the file being modified, deleted, or the like) the status of the content may be stored in CASB API datastore 125. The metadata stored locally will be information prior to the change indicated by the notification and may be useful for security enforcement as it may include data related to the type of file (i.e., content), provide indication of policies that should be applied to the file, and the like. Once the metadata is obtained, CASB API endpoint 120 may cache the metadata for quick access when the second notification of the change operation arrives from cloud service 115. The pre-processing may include, in some embodiments, pre-evaluating the change operation for security policies that may be applied based on the account information or entity requesting the change operation or based on the content being modified, shared, added, or the like. For example, certain users may have various security policies applied, and CASB API endpoint 120 may be able to use the information in the notification to determine which policies are needed for the user or entity and cache the policies for quick access when the second notification of the change operation arrives from cloud service 115. As another example, certain content may be subject to certain policies, and CASB API endpoint 120 may be able to use the information in the notification to determine which policies are needed for the content and cache those policies. The pre-processing may include, in some embodiments, downloading the associated content from cloud service 115. Because cloud service 115 may implement the change operation upon receipt of the change operation from CASB proxy 110, the downloaded content may be expected to be the latest content that the CASB API endpoint 120 would act on after receiving the second notification from cloud service 115. In some cases, cloud service 115 does not notify CASB API endpoint 120 immediately upon making a change but bundles multiple changes and sends periodic notifications, for example. Accordingly, CASB API endpoint 120 may download the content from cloud service 115 and cache it for quick access when the second notification of the change operation arrives from cloud service 115.

Once the second notification of the change operation arrives from cloud service 115, CASB API endpoint 120 may use the pre-processing to quickly perform security enforcement on the change operation. For example, the cached content, policies, and/or metadata may be quickly accessed and applied to determine whether the change operation is allowed. If the change operation is allowed, CASB API endpoint 120 may, in some embodiments, transmit an acknowledgement or other indication that the change operation did not violate security policies. If the change operation is not allowed, CASB API endpoint 120 may transmit a security operation back to cloud service 115. The security operation may include a modification to ensure the originally requested change operation meets security requirements. For example, modifying accounts that a document is shared with so that any that do not meet security policies are not included. In some cases, the security operation may be an instruction to roll the change operation back or, in other words, undo the change operation. For example, if a document is shared publicly that should not be shared publicly, the security operation may instruct cloud service 115 to remove the public sharing.

CASB API endpoint 120 may be served from a computing system in a data center, for example. The computing system may be, for example, computing device 600 as described with respect to FIG. 6. While a single CASB API endpoint 120 is shown for ease of description, many CASB API endpoint 120 may be implemented to perform security enforcement for many clients each having many user equipment 105. Further details of CASB API endpoint 120 are provided in FIG. 2 and the corresponding description.

CASB proxy 110 and CASB API endpoint 120 may be co-located, for example in a common data center. In some embodiments, CASB proxy 110 and CASB API endpoint 120 may be connected as Data Plane Point of Presence (DP-POP) and Management Plane Data Center (MP-DC).

As discussed above, minimizing change processing latency is desired. As shown in FIG. 1, change processing latency is the time taken for cloud service 115 to notify CASB API endpoint 120 of the change operation (shown as L1 in FIG. 1), plus the time taken for CASB API endpoint 120 to process security enforcement of the change operation (shown as L2 in FIG. 1), plus the time taken for CASB API endpoint 120 to send back any needed security operations (shown as L3 in FIG. 1). The time taken for CASB proxy 110 to notify CASB API endpoint 120 of the change (shown as L0 in FIG. 1) may be less than the time taken for cloud service 115 to notify CASB API endpoint 120 of the change (L1). For example, CASB proxy 110 and CASB API endpoint 120 may be co-located or otherwise in fast communication (e.g., DP-POP, MP-DC) such that the time for L0 is less than the time for L1. In some embodiments, cloud service 115 may bundle change notifications and send them periodically, which may further limit how quickly cloud service 115 notifies CASB API endpoint 120 of a change operation. Additionally, if CASB proxy 110 sends the notification to CASB API endpoint 120 at the same or substantially the same time as to cloud service 115, CASB API endpoint 120 does not have to wait for the time it takes CASB proxy 110 to notify cloud service 115 (shown as L4).

In some embodiments, CASB proxy 110 may send notification of all change operations to CASB API endpoint 120. In some embodiments, CASB proxy 110 may determine whether relevant pre-processing would be helpful to expedite CASB API endpoint 120 processing. As an example, certain changes such as modifying internal content of a document may not generally have much pre-processing value, but sharing content may often involve pre-processing that generates a lot of value for expediting security enforcement in CASB API endpoint 120. Accordingly, CASB proxy 110 may transmit notifications of change operations to CASB API endpoint 120 that have a high pre-processing value (e.g., sharing changes) and not transmit notifications of change operations to CASB API endpoint 120 that have a low pre-processing value (e.g., content edits). For example, CASB proxy 110 may include a list or other rule for determining which type of change operations to transmit notifications to CASB API endpoint 120.

CASB API datastore 125 may be a datastore that is local to or geographically near (e.g., in the same data center) CASB API endpoint 120. Accordingly, CASB API datastore 125 may reside in local memory of CASB API endpoint 120 or may be on a separate physical device from CASB API endpoint 120. CASB API datastore 125 may store data related to operations performed by CASB API endpoint 120. For example, current status of content that CASB API endpoint 120 has performed security enforcement on may be stored in CASB API datastore 125 to expedite future processing of security enforcement on the same content. CASB API datastore 125 may further store metadata associated with the content. CASB API datastore 125 may also store policies and configuration settings for CASB API endpoint 120 to use for security enforcement of change operations performed on cloud service 115.

In use, user equipment 105 sends a change operation that includes instructions for changing data or content in cloud service 115, and CASB proxy 110 intercepts the change operation. Upon receipt, CASB proxy 110 performs security enforcement on the change operation. For example, CASB proxy 110 may apply security policies to the change operation based on the user account requesting the change, the type of change, the content or data that is changing, and the like. Based on the security enforcement, CASB proxy 110 may determine the change operation is allowed. CASB proxy 110 transmits the change operation to cloud service 115 and transmits a notification to CASB API endpoint 120 of the change operation. CASB API endpoint 120 receives the notification and performs pre-processing of the change operation. The pre-processing may include accessing relevant data, policies, or metadata and caching them for quick access. Cloud service 115 receives the change operation and implements the change operation. Cloud service 115 transmits a second notification of the change operation to CASB API endpoint 120. CASB API endpoint 120 receives the second change notification and, using the pre-processing (e.g., cached data, metadata, policies, and the like), performs security enforcement on the change operation. Based on the security enforcement, CASB API endpoint 120 transmits a modification if the change is not allowed or transmits an acknowledgement or other notification that the change is allowed to cloud service 115 if the change is allowed.

Advantageously, the first notification of the change operation from CASB proxy 110 to CASB API endpoint 120 (L0) allows CASB API endpoint 120 to perform pre-processing that significantly reduces the change processing latency (L1+L2+L3).

Figure 2:
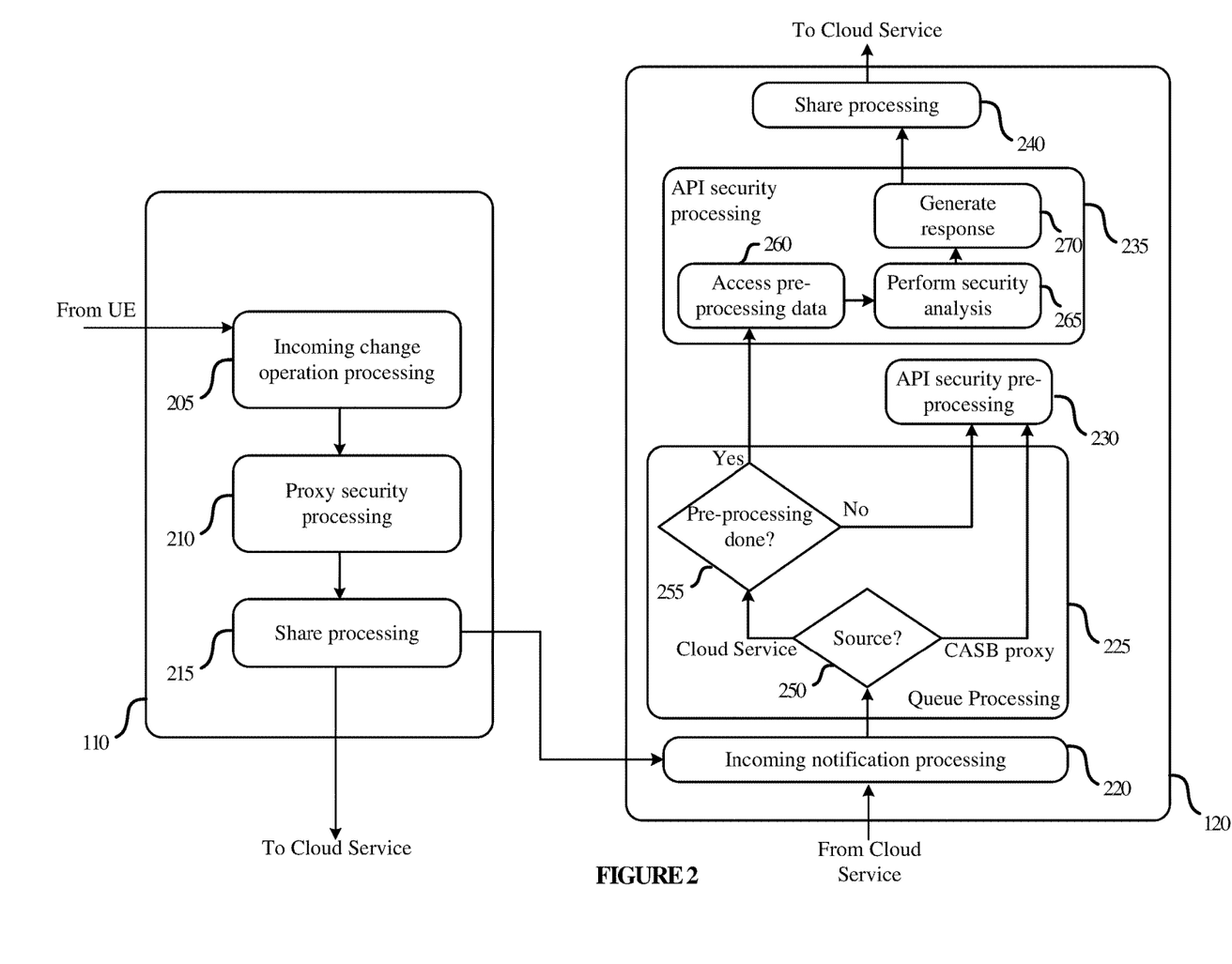
FIG. 2 illustrates additional details of the security enforcement of a cloud service, according to some embodiments.

FIG. 2 illustrates additional details and data flow of security enforcement using the improvements to CASB proxy 110 and CASB API endpoint 120 discussed above. As discussed above, CASB proxy 110 and CASB API endpoint 120 may be served using servers in a data center. CASB proxy 110 and CASB API endpoint 120 may be, for example, computing device 600 as described with respect to FIG. 6. Further, CASB proxy 110 and CASB API endpoint may be co-located or located geographically near each other and may use DP-POP or MP-DC.

CASB proxy 110 includes incoming change operation processing 205, proxy security processing 210, and share processing 215. Three modules or engines are shown for ease of description, but any number may be used or any format may be used to implement the functionality described without departing from the scope of this disclosure. CASB proxy 110 may receive a change operation from a UE (e.g., user equipment 105) at incoming change operation processing 205. Incoming change operation processing 205 may receive the change operation and optionally may perform initial processing of the change operation such as determining whether the change operation is subject to security enforcement and the like. Incoming change operation processing 205 may pass the change operation to proxy security processing 210 along with any other information obtained by incoming change operation processing 205 associated with the change operation. Proxy security processing 210 may perform security enforcement on the change operation. For example, proxy security processing 210 may apply security policies to the change operation to determine whether the change operation is allowed. The security policies may be selected based on the type of the change operation, the entity (e.g., user account) requesting the change operation, the content associated with the change operation, and the like. Proxy security processing 210 determines whether the change operation is allowed based on the CASB proxy 110 configuration. If proxy security processing 210 determines the change is not allowed, the change operation is not forwarded and is instead blocked from proceeding. In some embodiments, CASB proxy 110 sends a denial notification to the UE. If proxy security processing 210 determines the change is allowed, proxy security processing 210 forwards the change operation to share processing 215. Share processing 215 may transmit the change operation to the cloud service (e.g., cloud service 115) for processing. Share processing 215 may also generate a notification of the change operation and transmit the notification to CASB API endpoint 120. The notification may include information about the change operation and may include the change operation. The information about the change operation may include the entity requesting the change (e.g., the user account, metadata associated with the user account, or the like), the type of change, a filename associated with the change, and other data and metadata related to the change. In some embodiments, the notification may include metadata to identify the change operation, such as a tag or other identifier in a header of the notification.

CASB API endpoint 120 includes incoming notification processing 220, queue processing 225, API security pre-processing 230, API security processing 235, and share processing 240. Five modules or engines are shown for ease of description, but any number of modules or engines may be used or any format may be used to implement the functionality described without departing from the scope of this disclosure. CASB API endpoint 120 may receive notifications from CASB proxy 110 and from cloud service (e.g., cloud service 115). For the purposes of handling the incoming notifications, CASB API endpoint 120 may implement a queue to process the notifications in order of arrival, for example. An example queue is provided and discussed with respect to FIG. 3.

Incoming notification processing 220 may receive the notification and enter the notification into the queue. For example, the information provided in the notification may be entered into the queue entry as well as the source of the notification. For example, the source may be CASB proxy 110 or cloud service 115. In some embodiments, other options for sources of notifications may also be included. For example, multiple cloud services may be sources or multiple CASB proxies may be sources. Queue processing 225 may determine the source of the next entry in the queue for processing at source determination 250. If the source is CASB proxy 110, queue processing 225 passes the entry to API security pre-processing 230 for pre-processing. If the source is the cloud service, queue processing 225 determines whether pre-processing was already completed at pre-processing determination block 255. To determine whether pre-processing was already completed, queue processing 225 may determine whether a previous queue entry for the change notification from CASB proxy 110 was received and processed. For example, queue processing 225 may correlate a previous queue entry with the current queue entry based on a tag in the header of the notification that is stored with the queue entry as discussed in more detail with respect to FIG. 3. If the pre-processing was already completed, the queue entry is passed to API security processing 235. If the pre-processing is not already completed, queue processing 225 passes the queue entry to API security pre-processing 230.

API security pre-processing 230 receives the queue entry and begins pre-processing. Pre-processing steps may include fetching the current metadata related to the change operation from the CASB API datastore 125. For example, if CASB API endpoint 120 had previously performed security enforcement on the impacted content (e.g., the file being modified, deleted, or the like) the status of the content may be stored in a CASB API datastore 125. The metadata stored locally will be information prior to the change indicated by the notification and may be useful for security enforcement as it may include data related to the type of file (i.e., content), provide indication of policies that should be applied to the file, and the like. Once the metadata is obtained, CASB API endpoint 120 may cache the metadata for quick access when the second notification of the change operation arrives from cloud service 115. The pre-processing may include, in some embodiments, pre-evaluating the change operation for security policies that may be applied based on the account information or entity requesting the change operation or based on the content being modified, shared, added, or the like. For example, certain users may have various security policies applied, and CASB API endpoint 120 may be able to use the information in the notification to determine which policies are needed for the user or entity and cache the policies for quick access when the second notification of the change operation arrives from cloud service 115. As another example, certain content may be subject to certain policies, and CASB API endpoint 120 may be able to use the information in the notification to determine which policies are needed for the content and cache those policies. The pre-processing may include, in some embodiments, downloading the associated content from cloud service 115. Because cloud service 115 may implement the change operation upon receipt of the change operation from CASB proxy 110, the downloaded content may be expected to be the latest content that the CASB API endpoint 120 would act on after receiving the second notification from cloud service 115. In some cases, cloud service 115 does not notify CASB API endpoint 120 immediately upon making a change but bundles multiple changes and sends periodic notifications, for example. Accordingly, CASB API endpoint 120 may download the content from cloud service 115 and cache it for quick access when the second notification of the change operation arrives from cloud service 115.

API security processing 235 receives the queue entry when the cloud service is the source and the pre-processing is complete. Note that in some embodiments, when the cloud service is the source, even if pre-processing was not previously completed, API security processing may process the queue entry without additional pre-processing by a separate module or engine. Further, in some embodiments, when CASB proxy 110 is the source, if API security processing can be completed without notification from the cloud service, the processing may be completed and the response generated for immediate issuance once the notification from the cloud service is received.

API security processing 235 receives the queue entry and accesses the pre-processing data 260. For example, cached data, metadata, policies, and the like are accessed for expediting the security analysis of the change operation. API security processing uses the pre-processing data to perform security analysis 265. For example, relevant policies are applied to the change operation based on the change type, the user account, the content, and the like to determine whether the change operation is allowed. Based on the security analysis, API security processing 235 generates a response 270. The response may include an acknowledgement or other indication that the change operation is allowed. When the change operation is not allowed based on the security analysis, the response may include instructions to modify the change operation or completely roll back the change operation. API security processing 235 passes the response to share processing 240 to transmit the response to the cloud service (e.g., cloud service 115).

Figure 3:
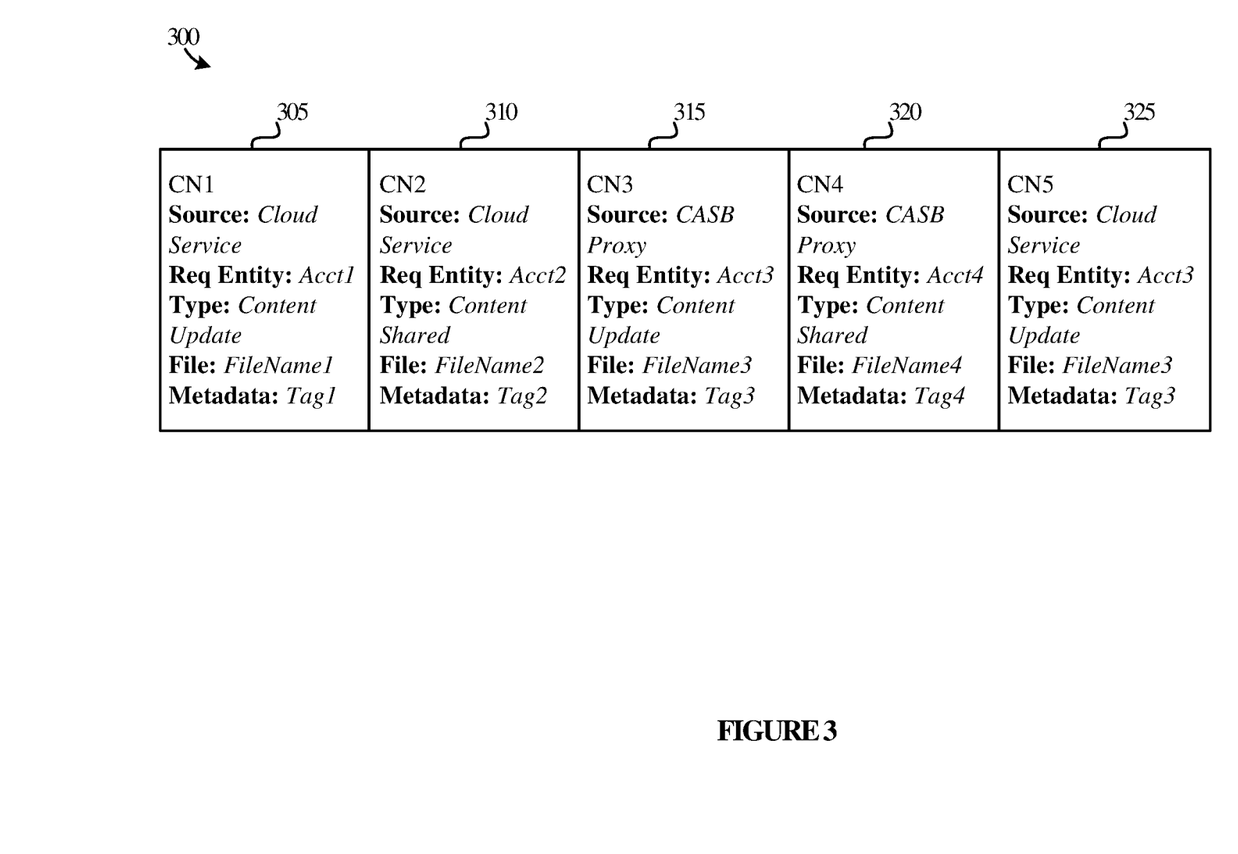
FIG. 3 illustrates an exemplary CASB API endpoint queue, according to some embodiments.

FIG. 3 illustrates an exemplary queue 300 used by CASB API endpoints (e.g., CASB API endpoint 120) for processing notifications of change operations in order of receipt. When a new notification arrives, the incoming notification is processed (e.g., incoming notification processing 220 as described with respect to FIG. 2). An entry is entered in queue 300. The exemplary queue 300 includes five entries. Change notification 1 (CN1) 305 is the first received notification still in the queue and is next up for processing. As shown in queue 300, the change notifications all include the same information, but in some embodiments different information may be available depending on the notification and entered in queue 300 accordingly. CN1 305 includes a source, showing that this notification was received from the cloud service (e.g., cloud service 115). CN1 305 also includes requesting entity information "Acct1." The requesting entity information may include data that identifies a user, a user account, or some other entity or identifier. The requesting entity information may be helpful to identify relevant policies to apply to the change notification. CN1 305 further includes change type information "Content Update." The change type information may identify the type of change requested by the change operation. For example, the requesting entity may wish to modify content, add content, delete content, share content, or the like. The type of change may also help identify relevant policies to apply to the change operation. CN1 305 further includes file information "FileName1." A file name or other identifier of a file that contains the content impacted by the change operation may be used for pre-processing. For example, CASB API endpoint 120 may download the file from cloud service 115 for performing the security analysis. Further, CN1 305 includes metadata "Tag1." The metadata may include metadata relevant to the change operation. In this example, the notification may have included a tag in the header to identify the change operation. The tag may be used to associate the notification from the CASB proxy and the notification from the cloud service. Similar data is supplied in each queue entry for CN2 310, CN3 315, CN4 320, and CN5 330.

CN3 315 is a queue entry for a notification of a change operation from the CASB proxy. The requesting entity is "Acct3," the type is "Content Update," the file is "FileName3," and the metadata indicates "Tag3." CN5 325 is a queue entry for a notification of a change operation from the cloud service. The requesting entity is "Acct3," the type is "Content Update," the file is "FileName3," and the metadata indicates "Tag3." Accordingly, when the CN5 325 queue entry is processed, the CASB API endpoint can correlate CN3 315 with CN5 325 based on, for example, the metadata indicating "Tag3" in both. When the CASB API endpoint processes CN3 315, it will perform pre-processing as discussed previously that will expedite processing of CN5 325.

Figure 4:
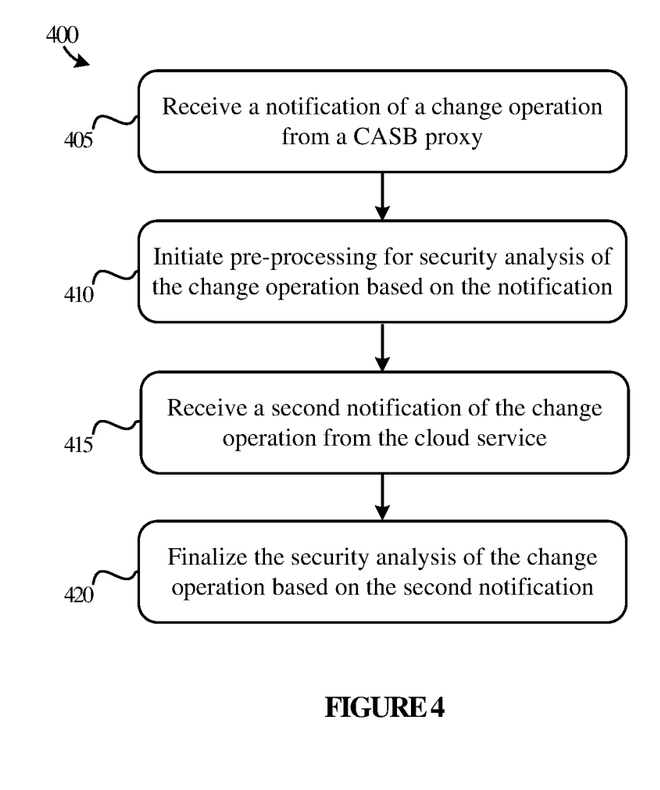
FIG. 4 illustrates a method for CASB API endpoint security, according to some embodiments.

FIG. 4 illustrates a method 400 for security enforcement by a CASB API endpoint. The CASB API endpoint may be CASB API endpoint 120. CASB API endpoint may receive a notification of a change operation from a CASB proxy at 405. The change notification may include information related to the change operation, and CASB API endpoint may create an entry in a queue (e.g., queue 300) representing the change notification. The change operation may include instructions for changing content in a cloud service. Based on receiving the notification, CASB API endpoint may initiate pre-processing for security analysis of the change operation using the information in the notification at 410. For example, once the queue entry for the notification is first, CASB API endpoint may analyze the queue entry to determine the source is the CASB proxy and send the queue entry for API security pre-processing (e.g., API security pre-processing 230). The API security pre-processing may include fetching data, metadata, policies, or the like associated with the change operation and caching them for use during security analysis.

CASB API endpoint may receive a second notification of the change operation from the cloud service at 415. Based on receiving the second notification, CASB API endpoint may finalize the security analysis of the change operation based on the second notification using the pre-processing data at 420. For example, relevant policies may be applied to the change operation based on the requesting entity, the content, the type of change, and the like to determine whether the change operation is allowed. If the change operation is allowed, CASB API endpoint may notify the cloud service. If the change operation is not allowed, CASB API endpoint may send instructions to the cloud service to roll back the change or modify the change to ensure it complies with the security policies. By using the pre-processing previously performed when the notification from the cloud service is processed, CASB API endpoint expedites change notification processing from the cloud service to minimize change processing latency.

Figure 5:
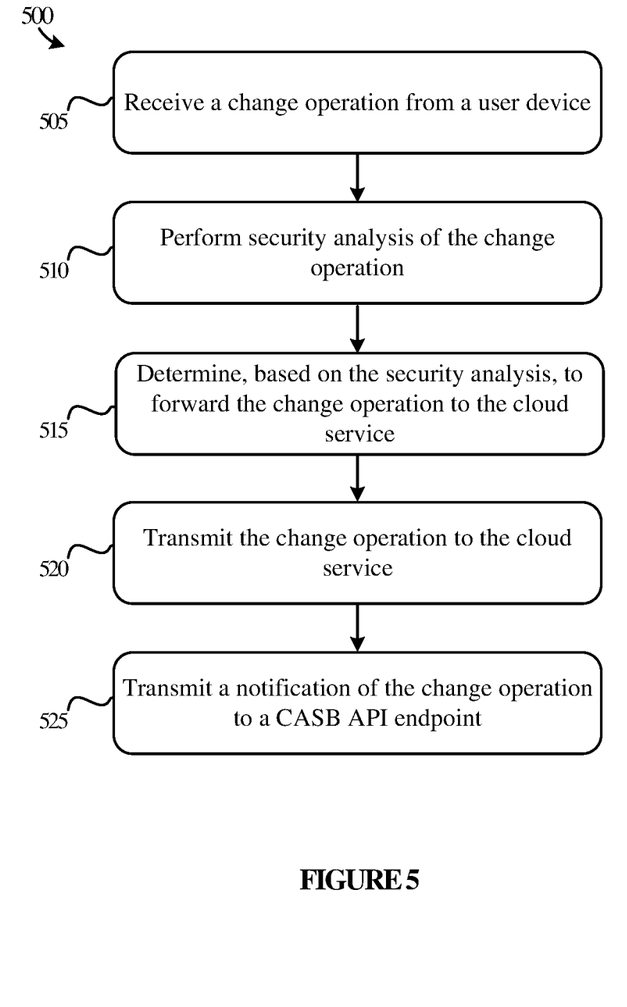
FIG. 5 illustrates a method for CASB proxy security, according to some embodiments.

FIG. 5 illustrates a method 500 for security enforcement by a CASB proxy. The CASB proxy may be CASB proxy 110. CASB proxy may receive a change operation from a user device at 505. The change operation may include instructions for changing data stored in a cloud service. In response to receiving the change operation, CASB proxy may perform security analysis of the change operation at 510. For example, security policies may be applied to the change operation based on the requesting entity, the content, the type of change, and the like. Based on application of the security policies, CASB proxy may determine whether the change is allowed. Based on determining that the change is allowed, CASB proxy determines to forward the change operation to the cloud service at 515. At 520, CASB proxy transmits the change operation to the cloud service for processing. At 525, CASB proxy transmits a notification of the change operation to the CASB API endpoint.

Figure 6:
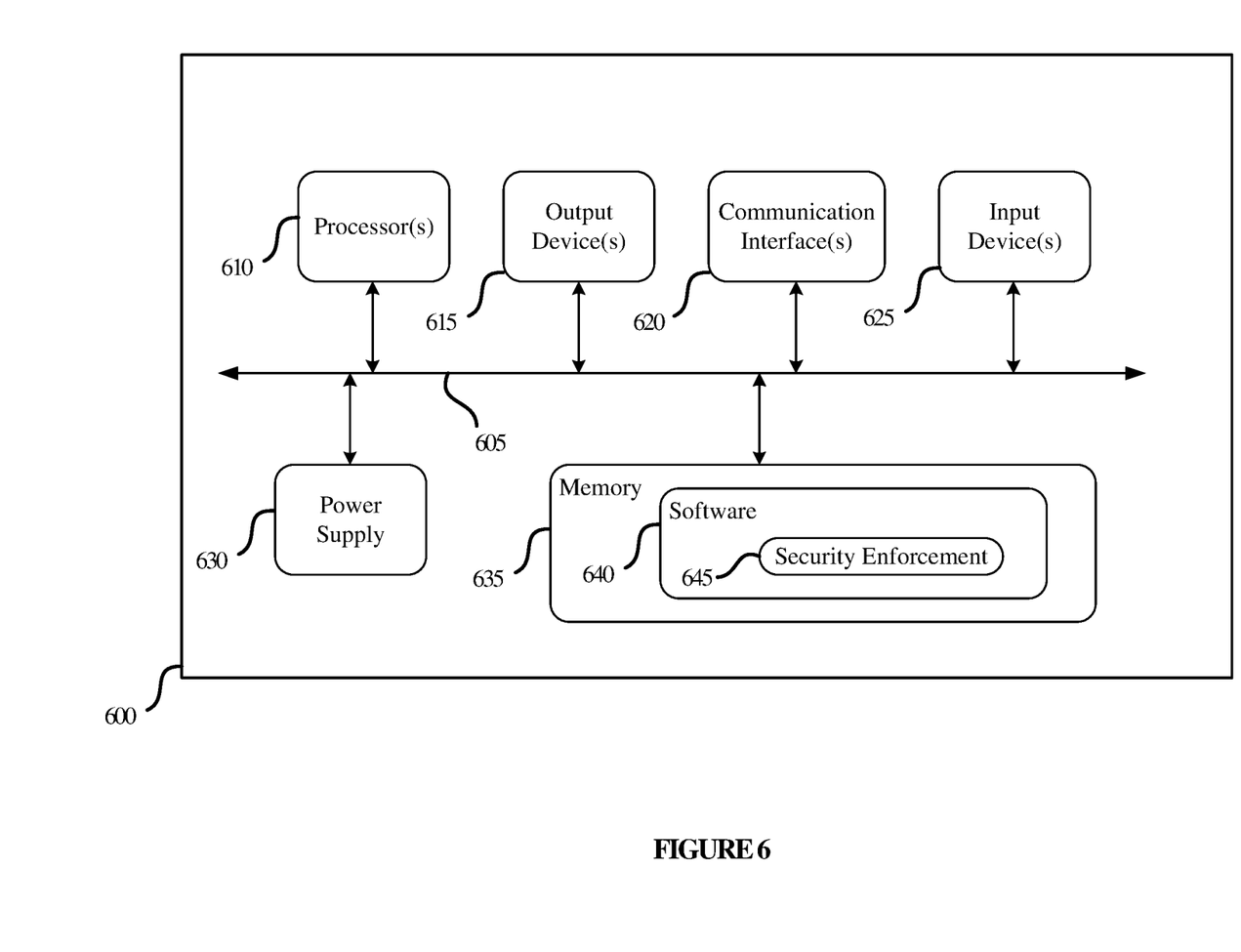
FIG. 6 illustrates a simplified representation of hardware and software residing within an exemplary computer system.

FIG. 6 illustrates a computing device 600. The computing device 600 includes various components not included for ease of description in other computing devices discussed herein including, for example, user equipment 105, CASB proxy 110, and CASB API endpoint 120. Accordingly, computing device 600 may be user equipment 105, CASB proxy 110, or CASB API endpoint by incorporating the functionality described in each.

Computing device 600 is suitable for implementing processing operations described herein related to security enforcement, with which aspects of the present disclosure may be practiced. Computing device 600 may be configured to implement processing operations of any component described herein including the user system components (e.g., user equipment 105 of FIG. 1). As such, computing device 600 may be configured as a specific purpose computing device that executes specific processing operations to solve the technical problems described herein including those pertaining to security enforcement and expediting processing to reduce change processing latency. Computing device 600 may be implemented as a single apparatus, system, or device or may be implemented in a distributed manner as multiple apparatuses, systems, or devices. For example, computing device 600 may comprise one or more computing devices that execute processing for applications and/or services over a distributed network to enable execution of processing operations described herein over one or more applications or services. Computing device 600 may comprise a collection of devices executing processing for front-end applications/services, back-end applications/services, or a combination thereof. Computing device 600 includes, but is not limited to, a bus 605 communicably coupling processors 610, output devices 615, communication interfaces 620, input devices 625, power supply 630, and memory 635.

Non-limiting examples of computing device 600 include smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processors 610 may include general processors, specialized processors such as graphical processing units (GPUs) and digital signal processors (DSPs), or a combination. Processors 610 may load and execute software 640 from memory 635. Software 640 may include one or more software components such as security enforcement 645. Security enforcement 645 may be configured to enable functionality described with respect to FIG. 2, method 400 of FIG. 4, method 500 of FIG. 5, and the like. In some examples, computing device 600 may be connected to other computing devices (e.g., display device, audio devices, servers, mobile/remote devices, VR devices, AR devices, etc.) to further enable processing operations to be executed. When executed by processors 610, software 640 directs processors 610 to operate as described herein for at least the various processes, operational scenarios, and sequences discussed in the foregoing implementations. Computing device 600 may optionally include additional devices, features, or functionality not discussed for purposes of brevity. For example, software 640 may include an operating system that is executed on computing device 600. Computing device 600 may further be utilized as user equipment 105 or any of the cloud computing systems in environment 100 (FIG. 1) including CASB proxy 110 (FIGS. 1 and 2) and CASB API endpoint 120 (FIGS. 1 and 2) or may execute the method 400 of FIG. 4 or method 500 of FIG. 5.

Referring still to FIG. 6, processors 610 may include a processor or microprocessor and other circuitry that retrieves and executes software 640 from memory 635. Processors 610 may be implemented within a single processing device but may also be distributed across multiple processing devices or sub-systems that cooperate in executing program instructions. Examples of processors 610 include general purpose central processing units, microprocessors, graphical processing units, application specific processors, sound cards, speakers and logic devices, gaming devices, VR devices, AR devices as well as any other type of processing devices, combinations, or variations thereof.

Memory 635 may include any computer readable storage media readable by processors 610 and capable of storing software 640. Memory 635 may include volatile and non-volatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations, memory 635 may also include computer readable communication media over which at least some of software 640 may be communicated internally or externally. Memory 635 may be implemented as a single storage device but may also be implemented across multiple storage devices or sub-systems co-located or distributed relative to each other. Memory 635 may include additional elements, such as a controller, capable of communicating with processors 610 or possibly other systems.

Software 640 may be implemented in program instructions and among other functions may, when executed by processors 610, direct processors 610 to operate as described with respect to the various operational scenarios, sequences, and processes illustrated herein. For example, software 640 may include program instructions for executing security enforcement 645 as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 640 may include additional processes, programs, or components, such as operating system software, virtual machine software, or other application software. Software 640 may also include firmware or some other form of machine-readable processing instructions executable by processors 610.

In general, software 640 may, when loaded into processors 610 and executed, transform a suitable apparatus, system, or device (of which computing device 600 is representative) overall from a general-purpose computing system into a special-purpose computing system customized to execute specific processing components described herein as well as process data and respond to queries. Indeed, encoding software 640 on memory 635 may transform the physical structure of memory 635. The specific transformation of the physical structure may depend on various factors in different implementations of this description. Examples of such factors may include, but are not limited to, the technology used to implement the storage media of memory 635 and whether the computer-storage media are characterized as primary or secondary storage, as well as other factors.

For example, if the computer readable storage media are implemented as semiconductor-based memory, software 640 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 620 may include communication connections and devices that allow for communication with other computing systems (not shown) over communication networks (not shown). Communication interfaces 620 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 620 may also include associated user interface software executable by processors 610 in support of the various user input and output devices discussed below. Separately or in conjunction with each other and other hardware and software elements, the user interface software and user interface devices may support a graphical user interface, a natural user interface, or any other type of user interface, for example, that enables front-end processing and including rendering of user interfaces, such as a user interface that is used by a user on user equipment 105. Exemplary applications/services may further be configured to interface with processing components of computing device 600 that enable output of other types of signals (e.g., audio output, handwritten input) in conjunction with operation of exemplary applications/services (e.g., a collaborative communication application/service, electronic meeting application/service, etc.) described herein.

Input devices 625 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 615 may include a display, speakers, haptic devices, and the like. In some cases, the input and output devices may be combined in a single device, such as a display capable of displaying images and receiving touch gestures. The aforementioned user input and output devices are well known in the art and need not be discussed at length here.

Communication between computing device 600 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The computing device 600 has a power supply 630, which may be implemented as one or more batteries. The power supply 630 may further include an external power source, such as an AC adapter or a powered docking cradle that supplements or recharges the batteries. In some embodiments, the power supply 630 may not include batteries and the power source may be an external power source such as an AC adapter.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

What is claimed is:

1. A computer-implemented method, comprising:
receiving, at a Cloud Access Security Broker (CASB) Application Programming Interface (API) endpoint, a notification of a change operation from a CASB proxy, wherein the change operation comprises instructions from a user device for changing data stored in a cloud service;
initiating, by the CASB API endpoint, pre-processing for security analysis of the change operation based on the notification;
receiving, at the CASB API endpoint, a second notification of the change operation from the cloud service; and
finalizing, by the CASB API endpoint, the security analysis of the change operation based on the second notification using the pre-processing.

2. The computer-implemented method of claim 1, wherein the notification comprises account information for an entity requesting the change operation.

3. The computer-implemented method of claim 1, wherein the notification comprises a change type of the change operation.

4. The computer-implemented method of claim 1, wherein the initiating the pre-processing for the security analysis of the change operation comprises:
obtaining, by the CASB API endpoint, current metadata associated with the change operation from a local datastore.

5. The computer-implemented method of claim 1, wherein the initiating the pre-processing for the security analysis of the change operation comprises:
pre-evaluating for policies based on the notification; and
caching the policies.

6. The computer-implemented method of claim 1, wherein the initiating the pre-processing for the security analysis of the change operation comprises:
downloading the data stored in the cloud service; and
caching the data.

7. The computer-implemented method of claim 1, further comprising:
storing, by the CASB API endpoint, an entry of the notification in a queue;
storing, by the CASB API endpoint, a second entry of the second notification in the queue; and
processing the entries in the queue in order.

8. The computer-implemented method of claim 1, further comprising:
associating, by the CASB API endpoint, the notification and the second notification based on metadata in the notification and the second notification.

9. The computer-implemented method of claim 1, wherein the CASB proxy and the CASB API endpoint are co-located in a datacenter.

10. The computer-implemented method of claim 1, wherein the CASB proxy and the CASB API endpoint are connected communicably connected as Data Plane Point of Presence (DP-POP) and Management Plane Data Center (MP-DC).

11. A system, comprising:
a Cloud Access Security Broker (CASB) proxy communicably coupled between a user device and a cloud service, the CASB proxy comprising:
one or more proxy processors, and
a proxy memory having stored thereon proxy instructions that, upon execution by the one or more proxy processors, cause the one or more proxy processors to:
receive a change operation from the user device, the change operation comprising instructions for changing data stored in the cloud service;
perform proxy security analysis of the change operation;
determine, based on the security analysis, to forward the change operation to the cloud service;
transmit the change operation to the cloud service; and
transmit a notification of the change operation to a CASB Application Programming Interface (API) endpoint; and
the CASB API endpoint communicably coupled to the cloud service and the CASB proxy, the CASB API endpoint comprising:
one or more processors, and
a memory having stored thereon instructions that, upon execution by the one or more processors, cause the one or more processors to:
receive the notification of the change operation from the CASB proxy;
initiate pre-processing for security analysis of the change operation;
receive a second notification of the change operation from the cloud service; and
in response to receiving the second notification, finalize the security analysis of the change operation using the pre-processing.

12. The system of claim 11, wherein the notification comprises one of account information for an entity requesting the change operation, a change type of the change operation, or a combination thereof.

13. The system of claim 11, wherein the instructions to initiate the pre-processing for the security analysis of the change operation comprises further instructions that, upon execution by the one or more processors, cause the one or more processors to:
obtain current metadata associated with the change operation from a local datastore.

14. The system of claim 11, wherein the instructions to initiate the pre-processing for the security analysis of the change operation comprises further instructions that, upon execution by the one or more processors, cause the one or more processors to:
pre-evaluate for policies based on the notification; and
cache the policies.

15. The system of claim 11, wherein the instructions to initiate the pre-processing for the security analysis of the change operation comprises further instructions that, upon execution by the one or more processors, cause the one or more processors to:
download the data stored in the cloud service; and
cache the data.

16. The system of claim 11, wherein the instructions comprise further instructions that, upon execution by the one or more processors, further cause the one or more processors to:
in response to receiving the notification, store an entry of the notification in a queue;
in response to receiving the second notification, store a second entry of the second notification in the queue; and
process the entries in the queue in order.

17. The system of claim 11, wherein the instructions comprise further instructions that, upon execution by the one or more processors, further cause the one or more processors to:

associate the notification and the second notification based on metadata in the notification and the second notification.

18. The system of claim 11, wherein the proxy memory has stored thereon further proxy instructions that, upon execution by the one or more proxy processors, further cause the one or more proxy processors to:

receive a confirmation that the change operation was performed from the cloud service.

19. A computer-implemented method, comprising:

receiving, at a Cloud Access Security Broker (CASB) proxy, a change operation from a user device, the change operation comprising instructions for changing data stored in a cloud service;

performing, by the CASB proxy, security analysis of the change operation;

determining, by the CASB proxy, based on the security analysis, to forward the change operation to the cloud service;

transmitting, by the CASB proxy, the change operation to the cloud service; and transmitting, by the CASB proxy, a notification of the change operation to a CASB Application Programming Interface (API) endpoint.

20. The computer-implemented method of claim 19, further comprising:

receiving, at the CASB proxy, a confirmation that the change operation was performed from the cloud service.

* * * * *